United States Patent [19]
Suzuki

[11] Patent Number: 4,949,553
[45] Date of Patent: Aug. 21, 1990

[54] AIR-CONDITIONER FOR AUTOMOBILES

[75] Inventor: Nobuhiko Suzuki, Konan, Japan

[73] Assignee: Diesel Kiki Co., Ltd., Tokyo, Japan

[21] Appl. No.: 452,274

[22] Filed: Dec. 18, 1989

[30] Foreign Application Priority Data

Jan. 12, 1989 [JP] Japan .................................... 1-5631

[51] Int. Cl.⁵ ............................................. F25B 27/02
[52] U.S. Cl. .................................. 62/238.7; 62/244;
62/323.1; 62/324.6; 165/42; 237/2 B
[58] Field of Search .................... 62/244, 323.1, 324.1,
62/324.6, 238.7, 238.6; 237/2 B; 165/29, 42, 43

[56] References Cited

U.S. PATENT DOCUMENTS

| | | | |
|---|---|---|---|
| 2,783,622 | 3/1957 | Bowassa | 62/244 X |
| 3,070,975 | 1/1963 | Cornelius | 62/244 X |
| 3,214,100 | 10/1965 | Aronson et al. | 165/43 X |
| 4,616,484 | 10/1986 | Mehdi et al. | 62/238.6 X |
| 4,688,394 | 8/1987 | Waldorf | 62/244 X |
| 4,697,434 | 10/1987 | Yuyama | 237/2 B X |

*Primary Examiner*—William E. Tapolcai
*Attorney, Agent, or Firm*—Wenderoth, Lind & Ponack

[57] ABSTRACT

An automobile air-conditioner of the type having a heat pump includes an exhaust gas heat exchanger for heating an engine cooling water by means of engine exhaust gas for rapidly increasing the temperature of air passing through a heater core when the heating operation is started, and a bypass passage bypassing a part of the engine cooling water and disposed in contact with a heat exchanger of the heat pump so as to achieve heat exchange operation between a refrigerant and the engine cooling water.

6 Claims, 5 Drawing Sheets

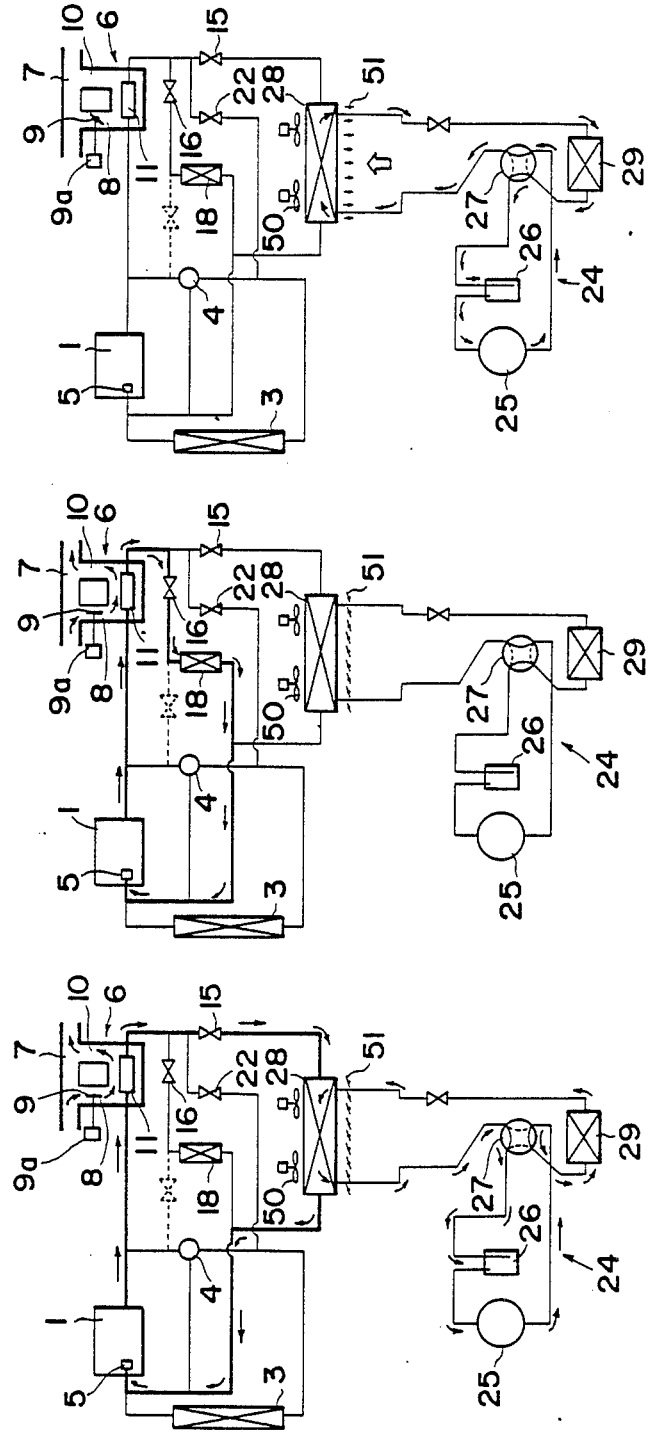

AIR-CONDITIONER FOR AUTOMOBILES

BACKGROUND OF THE INVENTION

1. Field of the Invention:

The present invention relates to an automobile air conditioner including a heat pump for heating and cooling the vehicle passenger compartment.

2. Description of the Prior Art:

Heaters generally used in automobiles are so-called "hot water heaters" in which engine cooling water (hot water) is utilized as a heat-transfer medium. When the engine starts up in winter, it takes long time to heat the engine cooling water at a sufficient temperature and hence an immediate heating of the vehicle passenger compartment is difficult to obtain.

With the foregoing drawback in view, an attempt has been proposed in which the hot water heater is replaced by a heat pump air-conditioner employing the outside air as a heat source. In the proposed heat pump air-conditioner such as disclosed, for example, in Japanese Patent Laid-open Publication No. 52-25341, the cooling system of an automobile air-conditioner is switched to a heat pump system wherein heat taken up from the outside air through a heat exchanger disposed outside the vehicle passenger compartment is recovered through another heat exchanger disposed inside the vehicle passenger compartment.

Inasmuch as the outside air is employed as a heat source, only an insufficient amount of heat can be taken up through the exterior heat exchanger when the outside air temperature is low. Accordingly, a sufficient heating effect is not provided by the disclosed heat pump air conditioner.

According to a modified heat pump air-conditioner disclosed in Japanese Patent Publication No. 60-236821, there is provided a third heat exchanger for taking up or absorbing heat from an engine cooling water during the heating operation mode.

The engine cooling water requires a long time for warming up and hence is regarded as an effective heat source for the heat pump air-conditioner capable of producing a quick heating effect. Regardless of the provision of the third heat exchanger, only two of three heat exchangers are engaged in the operation when the air-conditioner is operating in the heating mode or the cooling mode. As a result that, a certain amount of refrigerant is left unused in one heat exchanger which is not engaged in the heating or cooling operation. Due to such marooned inoperative refrigerant whose amount varies with atmospheric conditions and running conditions of the preceding operation, the amount of operative refrigerant in the cooling cycle becomes instable. In case of a large amount of refrigerant, the pressure becomes high. When the refrigerant is short, then an insufficient heating and cooling effect is produced.

According to another prior proposal disclosed in Japanese Utility Model Laid-open Publication No. 51-69455, a hot air outlet is disposed in front of the exterior heat exchanger for discharging hot air which is obtained through heat exchange operation with respect to engine exhaust gas so as to provide a heat source of a large capacity.

The disclosed arrangement requires a duct and an exhaust gas heat exchanger in addition to the hot air outlet stated above. Furthermore, the hot air outlet is disposed in face to face confrontation to an exterior heat exchanger disposed on the front face of an automobile so that part of heat is wasted to the outside air before it is transferred to the exterior heat exchanger. Thus, the overall thermal efficiency of the air-conditioner is considerably reduced.

SUMMARY OF THE INVENTION

With the foregoing difficulties in view, it is an object of the present invention to provide an automobile air-conditioner which is capable of producing a sufficiently heated air immediately after the heating operation is started.

Another object of the present invention is to provide an automobile air-conditioner which utilizes engine exhaust gas as a heat source during the heating operation mode employing a heat pump, thereby providing a high heat exchange rate between a heat transfer medium in the heat pump and the engine exhaust gas.

According to a first aspect of the present invention, there is provided an air-conditioner for an automobile, comprising: an exhaust gas heat exchanger for exchanging heat between exhaust gas leaving an internal combustion engine of the automobile and an engine cooling water; a heat pump including at least a compressor, an accumulator, a four-way valve, a first heat exchanger and a second heat exchanger that are connected in fluid circuit with each other and jointly constitute a cooling cycle which is reversible depending on the setting of the four-way valve; and a cooling water circulating circuit for circulating the engine cooling water and including a main circulating circuit for circulation of the engine cooling water, a bypass passage bypassing a part of the main circulating circuit for guiding a part of the engine cooling water to flow from the main circulating circuit to the bypass passage and then returning the part of the engine cooling water to the main circulating circuit, the bypass passage having a portion disposed in contact with a refrigerant passage in the first heat exchanger, and shut-off means for selectively opening and closing the bypass passage.

According to a second aspect of the present invention, there is provided an air-conditioner for an automobile, comprising: an exhaust gas heat exchanger for exchanging heat between exhaust gas leaving an internal combustion engine of the automobile and an engine cooling water; a heat pump including at least a compressor, an accumulator, a four-way valve, a first heat exchanger and a second heat exchanger that are connected in fluid circuit with each other and jointly constitute a cooling cycle which is reversible depending on the setting of the four-way valve; a cooling water circulating circuit for circulating the engine cooling water and including a main circulating circuit for circulation of the engine cooling water, a bypass passage bypassing a part of the main circulating circuit for guiding a part of the engine cooling water to flow from the main circulating circuit to the bypass passage and then returning the part of the engine cooling water to the main circulating circuit, the bypass passage having a portion disposed in contact with a refrigerant passage in the first heat exchanger, and shut-off means for selectively opening and closing the bypass passage; and a second cooling water circulating circuit comprising at least a hydraulic pump and a third heat exchanger connected together by a line, the line having a portion which constituting the portion of the bypass passage disposed in contact with the refrigerant passage in the first heat exchanger.

According to a third aspect of the present invention, there is provided an air-conditioner for an automobile, comprising: an exhaust gas heat exchanger for exchanging heat between exhaust gas leaving an internal combustion engine of the automobile and an engine cooling water; a heat pump including at least a compressor, an accumulator, a four-way valve, a first heat exchanger and a second heat exchanger that are connected in fluid circuit with each other and jointly constitute a cooling cycle which is reversible depending on the setting of the four-way valve; a cooling water circulating circuit for circulating the engine cooling water and including a main circulating circuit for circulation of the engine cooling water, a bypass passage bypassing a part of the main circulating circuit for guiding a part of the engine cooling water to flow from the main circulating circuit to the bypass passage and then returning the part of the engine cooling water to the main circulating circuit, the bypass passage having a portion disposed in contact with a refrigerant passage in the first heat exchanger, and shut-off means for selectively opening and closing the bypass passage; and a blower for forcing air toward the first heat exchanger of the heat pump, and a shutter disposed downstream of the first heat exchanger in confronting relation to an air-flow surface of the first heat exchanger.

With this construction, in the case where the temperature of the engine cooling water is still low, for instance, when the engine is started up with the air-conditioner set in the heating mode, the engine cooling water while being supplied is heated by engine exhaust gas. Heat of the engine cooling water thus heated is taken up through one of the heat exchangers, then transferred to the other heat exchanger from which heat is radiated. It is therefore possible to supply hot air to the vehicle passenger compartment soon after the starting-up of the engine. When a strong heating effect is desired, then the operation is changed to another heating mode in which the heater core is supplied with the engine cooling water which has been heated by the exhaust gas heat exchanger.

In the cooling mode, one of the heat exchangers of the heat pump is cooled by the engine cooling water or engine cooling air.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 6a is a circuit diagram of the automobile air-conditioner shown in FIG. 5 as it is operating in the heating mode employing a heat pump;

FIG. 6b is a view similar to FIG. 6a, but showing the automobile air-conditioner as it is operating in the high-power heating mode employing a heater core; and FIG. 6c is a view similar to FIG. 6a, but showing the automobile air-conditioner as it is operating in the cooling mode.

DETAILED DESCRIPTION

The present invention will be described hereinbelow in greater detail with reference to certain preferred embodiments shown in the accompanying drawings.

Figure 1:
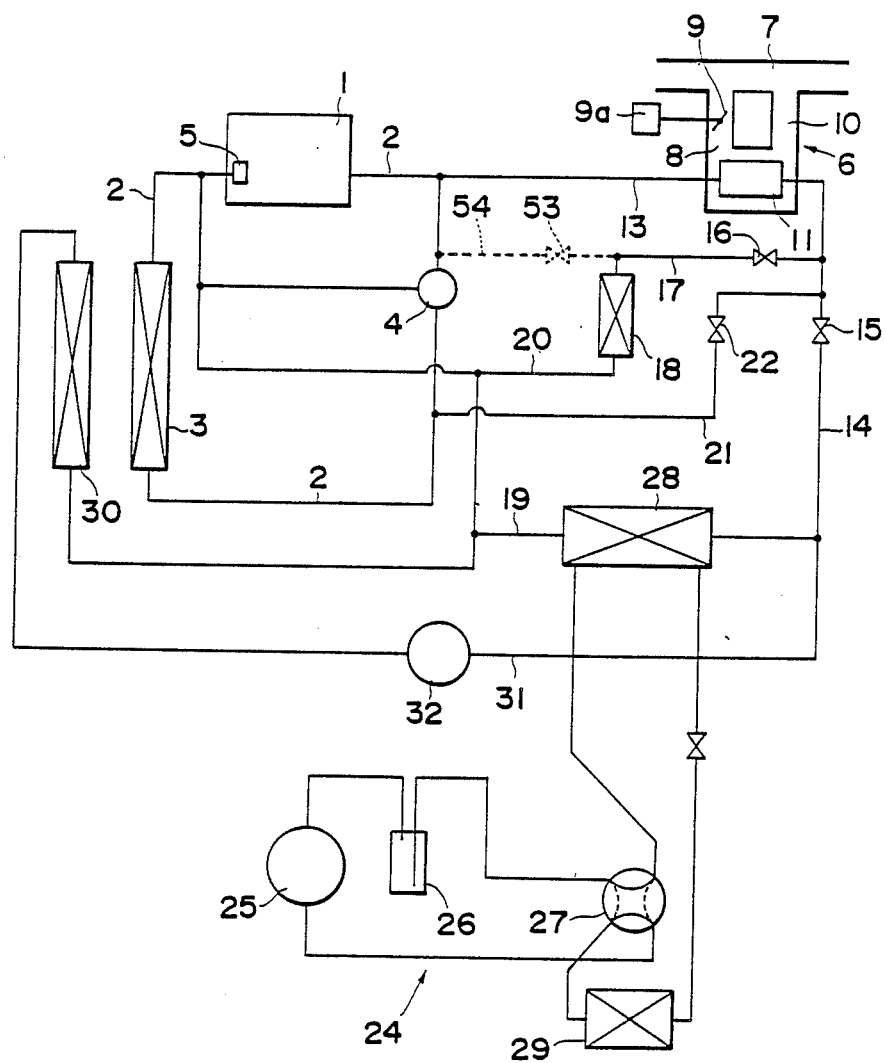
FIG. 1 is a circuit diagram of an automobile air-conditioner according to the present invention.

FIG. 1 illustrates an automobile air-conditioner according to a first embodiment of the present invention, which comprises an engine 1 connected by pipes 2 to a radiator 3 so as to form a cooling circuit. A thermostatic switch 4 is disposed in the cooling circuit so that the cooling circuit is short-circuited to separate the radiator 3 when the temperature of the engine cooling water is low. The engine 1 is equipped with a water pump 5 for circulating the engine cooling water through the cooling circuit. Designated by 6 is an exhaust gas heat exchanger for exchanging heat between the engine cooling water and exhaust gas leaving the engine 1. The engine exhaust gas is drawn from an exhaust pipe 7 into an intake passage 8, then flows through the exhaust gas heat exchanger 6 and finally returns from a discharge passage 10 to the exhaust pipe 7. The exhaust gas heat exchanger 6 has a core 11 across which the engine cooling water flows during circulation. Thus, the engine cooling water as it flows through the core 11 is subjected to heat-exchange operation with respect to exhaust gas so that it is heated by exhaust gas. The intake passage 8 is adapted to be opened and closed by a shut-off valve 9 driven by an actuator 9a. The shut-off valve 9 is closed when the exhaust gas is not necessary.

The core 11 of the exhaust gas heat exchanger 6 is connected with a pipe 13 connected to the pipe 2 of the cooling circuit so that the engine cooling water flows through the pipes 2 and 13 into the core 11 of the exhaust gas heat exchanger 6 in which the engine cooling water is heated through heat-exchange process. Then, the heated engine cooling water is fed selectively through a pipe 14 to a first heat exchanger 28 of a heat pump described later or through a pipe 17 to a heater core 18 provided for heating the vehicle passenger compartment. The pipe 14 is provided with a shut-off valve 15 and the pipe 17 is connected to the pipe 14 at a position upstream of the shut-off valve 15 and is provided with a shut-off valve 16, so that direction of flow of the engine cooling water is determined depending on the position of the shut-off valves 15, 16.

The discharge end of the first heat exchanger 28 and the discharge end of the heater core 18 are connected to the inlet side of the engine 1 respectively through a pipe 19 and a pipe 20 for returning the engine cooling water to the inlet of the water pump 5. Designated by 21 is a pipe bypassing the first heat exchanger 28 and the heater core 18. The bypass pipe 21 is provided with a shut-off valve 22.

The heat pump 24 includes, in addition to the first heat exchanger 28, a compressor 25 driven by the engine 1, an accumulator 26, a four-way valve 27 and a second heat exchanger 29 disposed in the vehicle passenger compartment, all the components 25–29 being connected in circuit with each other by piping so as to form a cooling system in which a cooling cycle is performed. When the four-way valve 27 is set in a position indicated by the solid lines shown in FIG. 1, the heating mode is selected, in which hot air is blown off from the second or interior heat exchanger 29. In the case where the four-way valve 27 is disposed in the position indicated by the broken lines shown in FIG. 1, cool air is discharged from the interior heat exchanger 29. Designated by 30 is a third heat exchanger connected with a pump 32 and a pipe 31 so as to jointly constitute a cooling circuit for cooling the first heat exchanger 28 while the air-conditioner is operating in the cooling mode employing the heat pump 24.

Figure 2:
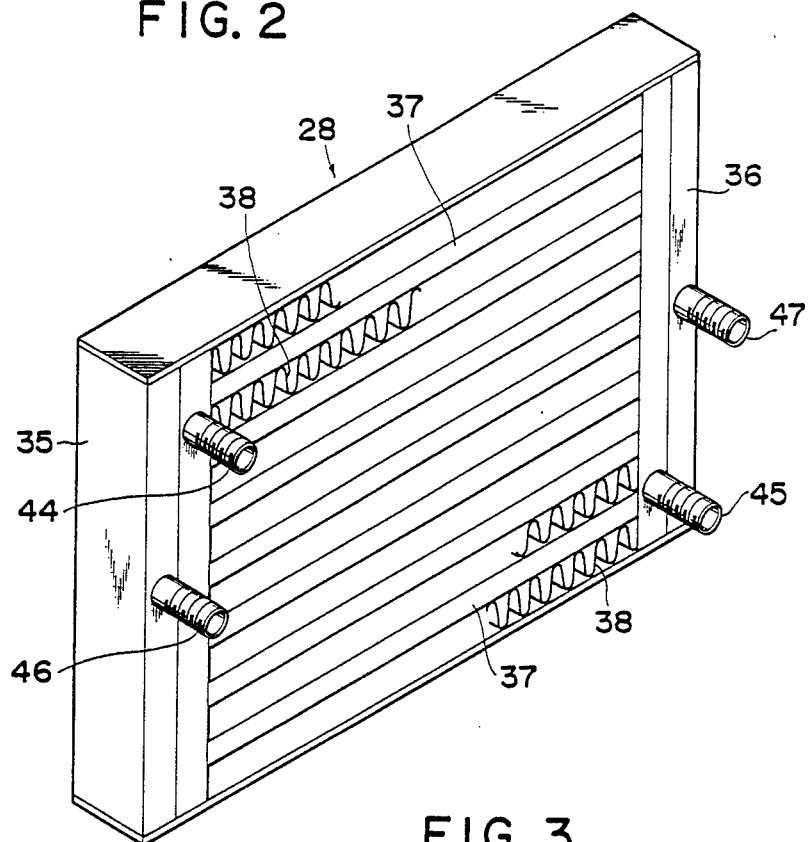
FIG. 2 is a perspective view of one heat exchanger of a heat pump incorporated in the automobile air-conditioner.

The first heat exchanger 28 of the heat pump 24 includes, as shown in FIG. 2, a pair of vertical headers 35, 36, a plurality of parallel spaced horizontal tubes 37 extending between the vertical headers 35, 36, and a plurality of corrugated fins 38 disposed between two adjacent ones of the horizontal tubes 37. (An adjacent pair of corrugated fins 38 is disposed on opposite sides of each horizontal tube 37.)

Figure 3:
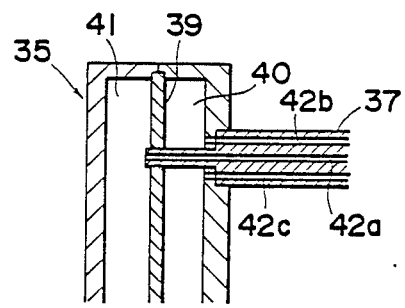
FIG. 3 is an enlarged cross sectional view of a portion of the heat exchanger shown in FIG. 2.

One 35 of the headers 35, 36 is an intake header and includes, as shown in FIG. 3, a first interior space 40 for the passage of a cooling medium or refrigerant and a second interior space 41 for the passage of the engine cooling water, the first and second interior spaces 40, 41 being separated by a vertical partition wall 39. Each of the first and second interior spaces 40, 41 are connected with tubes 37. The other header 36 is a discharge header and have the same construction as the intake header 35.

The tubes 37 have a flat cross-sectional shape and, as shown in FIG. 3, each of the tubes 37 has three longitudinal holes disposed one above another along a minor or shorter transverse axis of the flat tubes 37. The central hole 42a is provided for the passage of the engine cooling water while upper and lower holes 42b, 42c are provided for the passage of the refrigerant. Each end of the tubes 37 has a central portion projecting forwardly so that the central hole 42a can be connected with the second interior space 41 of each header 35, 36. On the other hand, the peripheral portion of the tube end is offset so that the upper end lower holes 42b, 42c can be connected with the first interior space 40 of the headers 35, 36.

Referring back to FIG. 2, the first heat exchanger 28 further includes a refrigerant inlet connector 44 attached to the intake header 35 for leading the refrigerant into the first interior space 40, and a refrigerant outlet connector 45 attached to the discharge header 36 for letting the refrigerant leave from the discharge header 36. Similarly, an engine cooling water inlet connector 46 and an engine cooling water outlet connector 47 are attached to the intake header 35 and the discharged header 36, respectively, and held in fluid communication with the second interior spaces 41 of the inlet and discharge headers 35, 36.

Figure 4A:
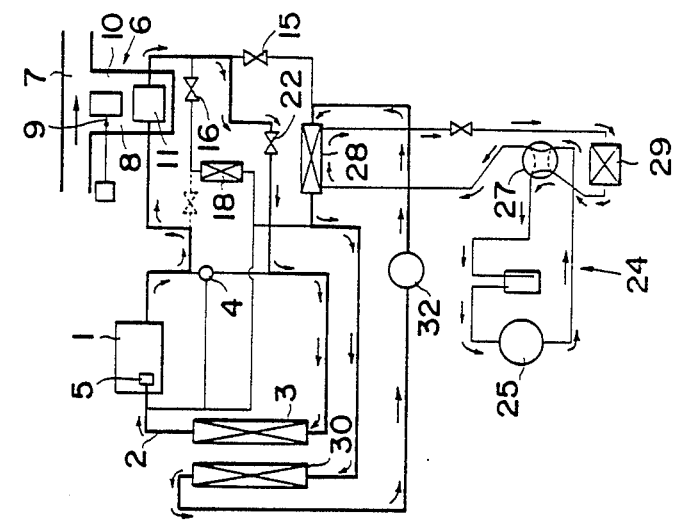
FIG. 4a is a circuit diagram of the automobile air-conditioner as it is operating in the heating mode employing a heat pump.

The automobile air-conditioner of the foregoing construction operates as follows: FIG. 4a shows a heating mode employing the heat pump 24 which is selected when the engine 1 is starting up and hence the temperature of the engine cooling water is still low. More particularly, this heating mode is selected when the temperature of the engine cooling water is lower than a predetermined value, for example, 50° C. at which another heating mode employing the heater core 18 cannot be effectively performed due to the lowness of the engine cooling water temperature. Thus, if the engine cooling water temperature is below the predetermined value at the time an occupant sets the heating mode, the foregoing heating mode in which the heat pump 24 is employed is automatically selected. Then, the engine cooling water is fed to the exhaust gas heat exchanger 6 at which it is heated by exhaust has leaving from the engine 1. The engine cooling water thus heated flows into the first heat exchanger 28 of the heat pump 24 in which it is subjected to heat exchange operation with respect to the refrigerant and gives off heat to the refrigerant. Then the refrigerant flows into the interior heat exchanger 29 where heat is radiated to the vehicle passenger compartment. In this heating mode, the shut-off valve 15 is open and the shut-off valves 16, 22 are closed. Since the heat taken up from the exhaust gas is given off to the refrigerant, a relatively hot air is discharged immediately after the engine 1 is started. Accordingly, the warming-up characteristic of the air-conditioner is improved.

Figure 4B:
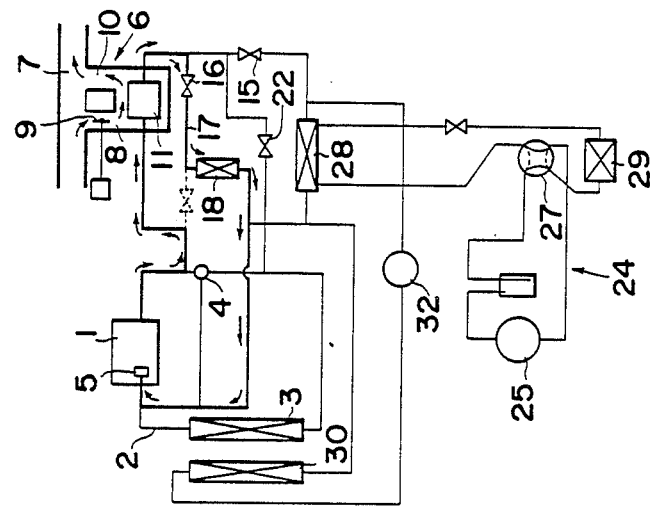
FIG. 4b is a view similar to FIG. 4b, but showing the automobile air-conditioner as it is operating in the high-power heating mode employing a heater core.

When the temperature of the engine cooling water rises to a predetermined value, the operation is changed to a high-power heating mode such as shown in FIG. 4b. In this heating mode, the shut-off valve 16 is open while the shut-off valve 15 and 22 are closed. Consequently, the engine cooling water heated by engine exhaust gas flows through the pipe 17 into the heater core 18 from which hot air is discharged into the vehicle passenger compartment. In this high-power heating mode, the heat pump 24 is kept in the inoperative state.

Since the engine cooling water is sufficiently heated at a high temperature by exhaust gas, a high-power heating is performed effectively. When the temperature of the engine cooling water while being heated by the exhaust gas heat exchanger exceeds a predetermined value, the heater core 18 may be damaged. To prevent the heater core 18 from damaging, opening and closing operation of the valve 9 is controlled to adjust the temperature of the engine cooling water within a predetermined temperature range. Thus, when a sufficient heating is performed solely by the heat of the engine cooling water or when the heating mode of a normal heating capacity is required instead of the high-power heating, the shut-off valve 9 of the exhaust gas heat exchanger 6 may be closed to stop operation of the exhaust gas heat exchanger 6.

The shut-off valve 9 may be omitted in which instance, the inlet side of the heater core 18 is connected by a pipe 54 (FIG. 1) with discharge side of the cooling circuit at a point upstream of the thermostatic switch 4. The pipe 54 is provided with a flow control valve 53 (FIG. 1) for controlling the amount of engine cooling water supplied to the heater core 18, depending on the opening of the flow control valve 53. Thus, a damage of the heater core 18 can be avoided.

In the foregoing heating modes, heat is transferred from the exhaust gas heat exchanger 6 to the first heat exchanger 28 or the heater core 18 via the heated engine cooling water so that the heat transferring efficiency is high.

Figure 4C:
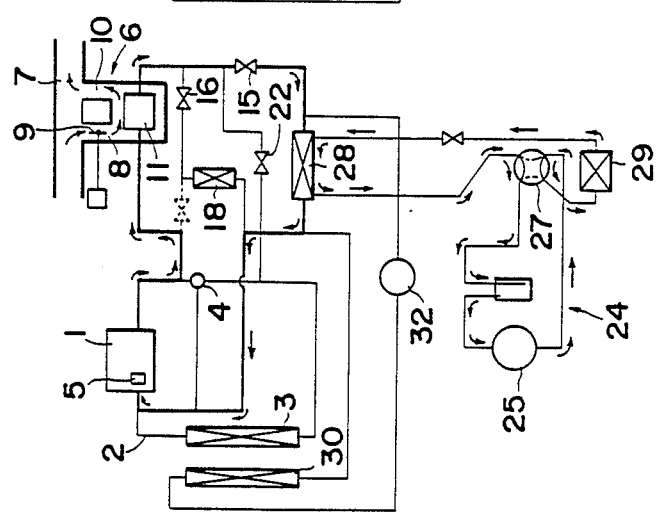
FIG. 4c is a view similar to FIG. 4a, but showing the automobile air-conditioner as it is operating in the cooling mode.

When the cooling mode is selected as shown in FIG. 4c, the shut-off valves 15, 16 are closed while the valve 22 is open and hence the engine cooling water flows in the direction indicated by the arrows. In this cooling mode, the pump 32 is driven to circulate the engine cooling water between the first heat exchanger 28 of the heat pump 24 and the third heat exchanger 30. Furthermore, the position of the four-way valve 27 is changed whereupon heat is taken up by the interior heat exchanger 29 (i.e., cooled air is discharged from the heat exchanger 29) and is given off to the engine cooling water in the first heat exchanger 28.

In this cooling mode, the heater core 11 is not necessary and hence the intake passage 8 is closed by the shut-off valve 9.

Figure 5:
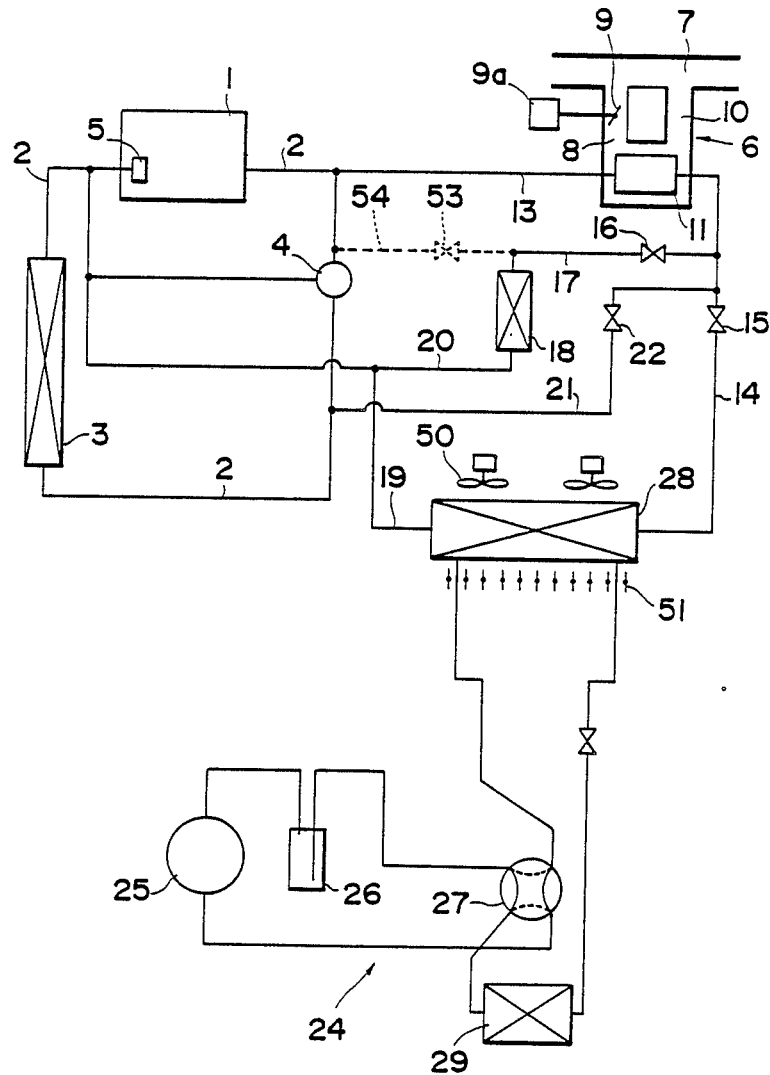
FIG. 5 is a circuit diagram of an automobile air-conditioner according to another embodiment.

A modified automobile air-conditioner shown in FIG. 5 is similar to the automobile air-conditioner shown in FIG. 1 but differs therefrom in that a cooling circuit for cooling the first heat exchanger 28 of the heat pump 24, i.e., the heat exchanger 30 is omitted, and a blower 50 and a shutter 51 are provided. The blower 50 is disposed on one side of the first heat exchanger 28 and the shutter 51 is disposed on the opposite side of the first heat exchanger 28 in confronting relation to an air-flow surface of the first heat exchanger 28. In the heating mode in which the engine cooling water is subjected to the heat exchange operation with respect to the refrigerant, the shutter 51 is closed to prevent thermal loss which would otherwise be caused by heated air leaving from the shutter 51. In the cooling mode, the blower 50 is driven and the shutter 51 is open so as to enhance passage of cooled air through the first heat exchanger 28. Other structural details of this air-conditioner are the same as that of the air-conditioner shown in FIG. 1. With this structural similarity, these components which correspond to the components of the first embodiment shown in FIG. 1 are designated by the same or corresponding reference characters and hence a description is no longer necessary.

In the embodiment shown in FIG. 5, when the temperature of the engine cooling water is lower than the predetermined value, the heating operation is achieved by using the heat pump 24 as illustrated in FIG. 6a. When the temperature of the engine cooling water exceeds the predetermined value, then the heater core 8 is employed to perform the high-power heating mode shown in FIG. 6b. In the cooling mode, the engine cooling water and the refrigerant flow as indicated by the arrows shown in FIG. 6c.

Although in the illustrated embodiments described above, the heating operation is automatically changed between the heating mode using the heat pump 24 and the high-power heat mode using the heater core 18 depending on the temperature of the engine cooling water, such selection of the heating mode may be achieved when the capacity of the heat pump 24 is shorter than as required.

Furthermore, the heating mode employing the heat pump 24 and the heating mode employing the heater core 18 may be combined so as to produce a stronger heating effect.

Obviously, various modifications and variations of the present invention are possible in the light of the above teaching. It is therefore to be understood that within the scope of the appended claims the present invention may be practiced otherwise than as specifically described.

What is claimed is:

1. An air-conditioner for an automobile, comprising:
   (a) an exhaust gas heat exchanger for exchanging heat between exhaust gas leaving an internal combustion engine of the automobile and an engine cooling water;
   (b) a heat pump including at least a compressor, an accumulator, a four-way valve, a first heat exchanger and a second heat exchanger that are connected in fluid circuit with each other and jointly constitute a cooling cycle which is reversible depending on the setting of said four-way valve; and
   (c) a cooling water circulating circuit for circulating the engine cooling water and including
      (i) a main circulating circuit for circulation of the engine cooling water,
      (ii) a bypass passage bypassing a part of said main circulating circuit for guiding a part of the engine cooling water to flow from the main circulating circuit to said bypass passage and then returning the part of the engine cooling water to said main circulating circuit, said bypass passage having a portion disposed in contact with a refrigerant passage in said first heat exchanger, and
      (iii) shut-off means for selectively opening and closing said bypass passage.

2. An air-conditioner according to claim 1, further including a second cooling water circulating circuit comprising at least a hydraulic pump and a third heat exchanger connected together by a line, said line having a portion which constituting said portion of said bypass passage disposed in contact with said refrigerant passage in said first heat exchanger.

3. An air-conditioner according to claim 1, further including a blower for forcing air toward said first heat exchanger of said heat pump, and a shutter disposed downstream of said first heat exchanger in confronting relation to an air-flow surface of said first heat exchanger.

4. An air-conditioner according to claim 1, wherein said first heat exchanger includes a plurality of tubes, a first header connected to one ends of the respective tubes and communicating with the interior space of the tubes, a second header connected to other ends of the respective tubes and communicating with the interior space of the tubes, and a plurality of fins each disposed two adjacent ones of said tubes.

5. An air-conditioner according to claim 4, wherein each of said first and second headers has two internal spaces separated by a partition wall.

6. An air-conditioner according to claim 5, wherein said tubes have a flat cylindrical shape and each have three longitudinal holes disposed one above another in a transverse direction of each tube, each end of said tube having a central portion projecting forwardly, a central one of said three longitudinal holes extending through said forwardly projecting central portion and connected to one of said two internal spaces of each of said first and second header, the remaining holes being connected at opposite ends to the other internal space in the first header and the other internal space in the second header.

* * * * *